Figure 1:
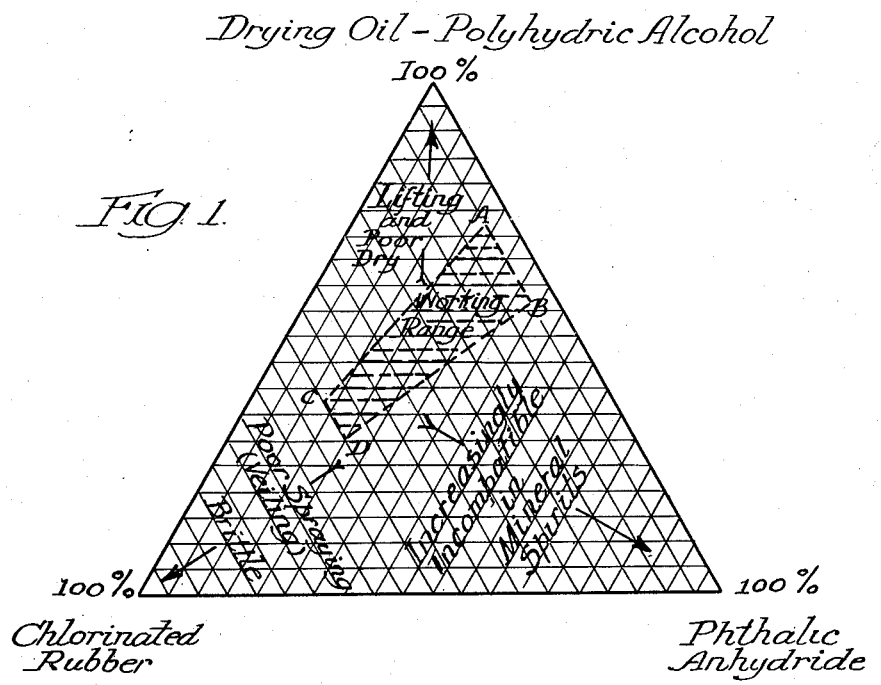

Inventors
Kenneth R. Brown
Harvey L. Piepho
Francis H. Thomas

United States Patent Office 2,706,162
Patented Apr. 12, 1955

2,706,162

METHOD OF FINISHING WOODEN ARTICLES AND ARTICLE PRODUCED THEREBY

Kenneth R. Brown, Chicago, Harvey L. Piepho, Merrionette Park, and Francis H. Thomas, Flossmoor, Ill., assignors to The Sherwin-Williams Company, Cleveland, Ohio, a corporation of Ohio Application July 23, 1949, Serial No. 106,426

11 Claims. (Cl. 117—72)

This invention pertains to an improved combination of novel wood filler and sealer compositions useful in the production of fine furniture finishes and to a method of finishing whereby the time necessary for the complete operation of finishing can be materially lessened.

Heretofore it has been the practice in the art of finishing wooden articles to employ either a varnish type finishing system or a lacquer type system for this operation. In the varnish system, the change of the applied coating from a liquid to a solid requires considerable time. Initially, the solvent used to thin the coating evaporates, requiring from 15 to 45 minutes. Following the evaporation of the solvent, the applied varnish-type coating remains apparently inactive as to drying through an inductance phase which is of indefinite time, depending upon the varnish composition. After the inductance phase it is believed that an oxidation of the coating occurs whereby oxygen from the ambient atmosphere is utilized by the coating and considerable thickening of the coating is observable. After initial oxidation, it is also believed that polymerization within the coating is initiated and in the later drying stages, both oxidation and polymerization reactions produce the final "dry" coating from the initially "wet" liquid coating. The time required is quite long, depending upon the characteristics of the individual varnish coat, but it commonly requires an over-night period for furniture finishes of the oleoresinous varnish type to "dry."

The extended drying times of such finishes requires overly large drying rooms and are a serious bottleneck in furniture production lines. To overcome this problem, lacquers have been formulated and used to shorten the drying period. By the general term "lacquers" is meant coating compositions which dry almost entirely by evaporation of solvent to leave a coating of a cellulose ester or ether, e. g., nitrocellulose or ethyl cellulose. Inasmuch as lacquers are dry to handle upon evaporation of the solvent, it is not unusual to be able to package a lacquer finished article within half an hour after the final spray application.

In furniture finishing, the use of lacquers is objectionable, however, because of the low film solids which they contain at the moment of application. The lack of high solids content prevents the coating from providing fullness of build or thickness which is necessary to the smoothness and the desired depth of finish without multiple coating operations. Because of the high solvency power of the esters and ketones used to dissolve the cellulose ester or ether components of the lacquers, it has not been practical heretofore to use a mixed system wherein a high solids varnish type filler and sealer is top-coated or finished with a lacquer material. When attempting to apply a lacquer coating to a varnish sealer, the solvents of the lacquer penetrate the varnish and cause the primary coatings to separate from the surface of the article finished. Sometimes the penetration is sufficiently deep to lift the filler, but more often the lacquer solvents only penetrate the sealer to form soft blisters in that coating, yielding a final film devoid of film strength.

In the unusual case wherein the high solvency solvents in the lacquers do not lift the primary coatings, they produce a weakened bond between the varnish and the lacquer which is detrimental to the quality of the finish.

Lacquer systems have also been found objectionable in cases where the practice has been to use a lacquer sealer over the conventional oil filler. It often occurs that the solvent retained by the filler, or the non-volatile oil of the filler, both of which are incompatible with nitrocellulose lacquers, migrate into a superimposed wet lacquer sealer and because of the incompatibility with the nitrocellulose the latter tends to precipitate out. This objectionable occurrence is referred to as "bleaching" or "graying." Even though the filler may appear to be dry, "graying" occasionally occurs. This may be due to the less saturated and poorer drying oils in the oil filler coat migrating or bleeding into the nitrocellulose top coat. If this phenomenon occurs it is most detrimental to the finished article and often requires refinishing of the article. In the finishing system herein proposed, increased compatibility between the filler coat and the sealer coat has been found to eliminate the problem described.

Because of the dangers of contamination of lacquer systems of finishing when employed in conjunction with varnish systems, it is usual to find a manufacturer adopting either one system or the other, depending upon preference. While it has been desirable to employ lacquer type finish coats over a varnish base sealer coat, such operation has heretofore been too risky a venture in view of the unpredictable behavior of the combination.

Another defect common in present furniture finishing systems particularly those of the lacquer type, is the poor resistance to marring. Marring is usually the result of high shearing stresses set up between the top coat or finish coat and the sealer coat and is evidenced by a "milky-way" along the line of the shear path. The opaqueness which develops is due to poor adhesion between the coatings which allows a separation and a formation of an air interface between subsequent films. The difference in index of refraction between the air and the film coatings is believed to account for the white appearance of the marred sections.

In the usual finishing procedure labeled "conventional" for convenience, starting with a varnish sealer, it was necessary to continue and complete the process with an entire varnish system. But if one started with a lacquer sealer, it was possible to elect to use either a lacquer or varnish top coat. In either instance, however, the adhesion between the sealer and the finish coat was generally poor. Defects such as crawling of the top coat due to poor wetting of the sealer by the top coat, or permanent marring, due to separation between the sealer coat and top coat along the line of the shear path is a common cause for complaint and rejection of the final finished article. This defect is particularly found with lacquer finishing systems.

One object of the invention is to improve the quality of furniture finishing coatings.

A further object is to provide a new and improved method for producing mar resistant finishes.

Another object of the invention is to provide a strongly polar type drying oil in the initial coating applied to the wood so as to increase the bond between the surface of the wood and the subsequent coatings applied thereto.

Another object is to provide a synthetic resinous varnish sealer coating composition of such characteristics that after application directly to an unoxidized polar oil type primary coating the sealer coating will flow out without wrinkling or crawling or otherwise producing optical aberration of the light incident to the coated surface.

Still another object is to provide a varnish sealer coat that can be applied directly over a "wet" filler coating and effectively prevent the usual oxidation of the oil prior to drying of the filler by excluding the air therefrom.

An additional object is to provide a varnish sealer coat which when applied to the polar oil-containing filler coat will flow smoothly over the coat and co-dry with the filler principally by polymerization, resulting in improved adhesion between the filler and the sealer.

Other objects will become apparent to those skilled in the art as the composition of the filler and sealer coatings are disclosed and the process for their use more fully described.

In accordance with the present invention, it has been found that if the filler coat, or in certain instances the wiping stain, contains a strongly polar oil, and the sealer coat is carefully balanced as to the percentage of phthalic anhydride present in the oil modified alkyd, the phthalic anhydride forming a large proportion of the sealer coat solids, as hereinafter described in greater detail, a combination of coatings is provided forming a greatly improved base for subsequently applied coatings of either the lacquer type or the varnish type. It has been determined through practical testing in the field that the herein described method of coating provides an excellence of adhesion not heretofore obtained in furniture finishes. An added feature of the system is that no detrimental after effects due to migration of liquids into nitrocellulose lacquer top coats from the base filler-sealer coats has been observed. The system provides consistent production of quality work without rejection due to "grayness" or "bleaching," when applied to wooden surfaces. Application upon metal surfaces in initial testing has indicated the method to be more useful when applied to wooden surfaces.

An additional improvement over prior furniture finishes has been observed as a result of "cold check" resistance tests. Wood veneer panels coated with the finishing systems to be tested are cooled rapidly to 20 degrees below zero degrees F., and held for one-half hour, then the panels are exposed to a temperature of 125 degrees F., for one-half hour. This cycle of temperature is repeated and as a result a strain is set up at the various interfaces. A wide variety of furniture finishing systems were tested in comparison with the one herein described. All failed before 15 cycles had been run, with the larger number failing before 5 cycles had been completed. At the completion of 25 cycles the combination disclosed showed no evidence of interface failure or splitting along the grain of the veneer, referred to as "veneer splitting."

From experience gained in attempting to evaluate adhesion of coatings to wooden surfaces it has been determined that a test indicating the degree of resistance to scratching provides a most practical means of comparison of one finish or finishing method with another. A practical test is performed by drawing a milled coin broadside along the test surface and exerting considerable pressure on the coin approximately normal to the test surface. Upon repeated testing of a finishing system including the components herein described no separation was apparent between the subsequent coatings even though the pressure on the coin was of such magnitude as to permanently distort the wooden surface beneath the coatings. The same test when applied to prior art coating systems produced separation between the coatings, indicated by white streaks before sufficient pressure was applied to deform the wood.

An advantageous procedure practiced with the invention disclosed has been to stain the article with a spirit stain if a filler coat is to be applied, or if the wood is of a close grain dense character, not requiring a filler, to use a wiping stain including the polar oil subsequently discussed to obtain the desired color in the wood. If a spirit stain is applied, a thirty minute period is preferably allowed before the application of the polar oil type filler. After application of the polar oil type filler in the latter case or the polar oil type stain in the case of the close grained wood, the excess in either case is removed by a usual wiping step. Following the wiping and preferably while the wood filler or stain is in a "wet" or unoxidized state, the sealer composition of the invention is applied and both coatings are allowed to co-dry from one and one-half hours to twelve hours depending upon the temperature and humidity of the drying room.

After the filler-sealer or oil stain-sealer combination has dried, the article so primed may be completed at the election of the manufacturer either by adding a varnish top coat or a lacquer top coat without danger of lifting of the synthetic base coat or "graying" of the completed surface. With either election the complete finishing system results in a superior mar and scratch resistance and better adhesion between subsequent surfaces than has heretofore been obtained by use of prior conventional systems.

THE FILLER COMPOSITION

In the formulation of fillers it is almost universal practice to utilize raw or boiled linseed oil or other natural drying oils without appreciably altering their compositions as by cooking in resins or otherwise modifying their physical and chemical properties. Such oils are characterized by their low acid values and the fact that they are essentially triglycerides of linoleic, linolenic and oleic acids in the approximate proportion as they occur in natural oil bearing seeds. It has been found that variation from the above described compositions usually result in fillers which after application are sticky, or rapidly become sticky so that wiping off of the excess filler is most difficult.

The filler oil herein described is of considerably different chemical composition than heretofore used. It has unusual merit in assisting to overcome bonding troubles between the surface of the wood and the sealer coat. Although it is modified toward a varnish in composition, it can be wiped without introducing the problems of stickiness and "hard-to-wipe" characteristics usually inherent in varnish base fillers or varnish type stains.

Fillers are generally composed of inert pigments, colors and drying oils. Inasmuch as such compositions are well known in the art, it is not deemed essential to develop the many variables in the pigmentary portion of the formulation. In both experimentation and practice, standard filler formulations have been followed except for the binder or oil portion of the formulas. It is the particular filler oil in the filler which accounts mainly for the marked improvement of the filler composition in the furniture finishing system herein described.

The filler oil differs particularly from other oils heretofore used in that it possesses a high acid value derived not from oil fatty acids but created through diene reaction between a small amount of maleic anhydride and a drying oil fatty acid drying oil mixture of approximately equal parts of each of the said oily constituents. The preferred amount of maleic anhydride used has been found in the range of 2 to 3%, based on the oil fatty acid content. The drying oil, fatty acids and maleic anhydride are heated to between 350 and 400 degrees F., and held for from thirty to sixty mniutes. Thereafter, pentaerythritol is added along with catalytic amounts of litharge, e. g., 1.5 to 2 parts per 1000 parts of the mixture, to assist in esterification of the free carboxyl groups and ester rearrangement within the molecule. The amount of pentaerythritol added is in theoretical excess of that necessary to satisfy the acidic groups present, the molar ratio of acidic to alcoholic groups being not more than 1.5 to 2.5. However, since the esterification reaction is not carried to completion, free carboxyl groups, also of a polar nature, exist. The resulting polar oil has an acid value from 15 to 40 and preferably between 25 and 35.

While glycerine-phthalic anhydride-drying oil combinations have been used in oil fillers, they are objectionable as previously mentioned because of poor wiping characteristics. When drying oils are conjoined it is usual that the subsequent oleoresinous varnish is depreciated as to its ability to be freely wiped from the surfaces to which it may be applied.

Upon testing a number of commercially available wood fillers of the unmodified oil type it has been observed in a consistent group of cases that a milkiness developed between the filler and the sealer coat. It is believed that this defect arises because of incompatibility between the straight oil type filler and the synthetic sealer, the less complex molecules of the filler migrating into the superimposed sealer causing a precipitation of certain portions of the sealer. When the filler is of the polar oil type as described and used in combination with our synthetic sealer such defects are eliminated.

Normally, an oil type filler which is allowed to dry prior to application of the sealer dries through several steps or phases. The first phase is an induction period usually caused by the presence of certain anti-oxidants naturally present in the oils which inhibit the second or oxidation phase during which it is believed certain labile peroxide groups are formed within the drying oil molecule. A third phase following oxidation is one of polymerization between adjacent oil molecules activated by the oxidation phase.

Under our particular process the oil filler is not long exposed to the oxygen of the air due to the immediate application of the sealer coat, and it is believed that air exclusion gives rise to a drying phase in which polymerization predominates and a stronger bond between the sealer and the oil filler is thereby developed.

It is also believed that the carboxyl and hydroxyl groups residual in the filler oil or the oil stain, as the case may be, are attracted to the wood filler or wood stain and to the filler air or stain air interface and are in some measure responsible for the compatibility and the excellent bond obtained between the wood and the subsequent sealer coat.

THE SEALER COMPOSITION

The second critical element of our furniture finishing system is the composition of the sealer coat. It has been observed that the sealer coat composition useful in accomplishing our objectives is a specific composition of matter not heretofore used as a sealer in wood finishing systems. We have found that the percentage of phthalic anhydride in the sealer coat is quite critical and if it is less than 25% of the drying oil-phthalic anhydride-glycerine content of the sealer, the dried film after application will not withstand the action of lacquer solvents. Finish coatings in systems outside this range are limited to other varnishes and coatings not containing the high solvency ketones and esters characteristic of nitrocellulose lacquers as top coats. If the phthalic anhydride content is greater than 40% of the oil modified alkyd, the sealer loses miscibility with the chlorinated rubber therein and with the aliphatic type solvents that are used in some instances for reduction of the viscosity. Further, the sealer becomes brittle as the phthalic anhydride content is increased and a sacrifice in the toughness of the film is experienced. The optimum and preferred range of phthalic anhydride in the oil modified alkyd varnish solids has been found to be between 30 and 35%.

It has also been found desirable to have present a drying oil modifying portion in the alkyd varnish to increase the flexibility of the alkyd and to produce an air drying quality in the sealer. The drying oil portion may be linseed, perilla, chia, safflower, sunflower, oiticica, soya dehydrated castor oil, China-wood oil, or other drying oil having an iodine value above 120 (Wijs).

Another modifying portion of the sealer coating composition solids is chlorinated natural rubber. Superior results have been obtained when from 5% to 50%, based on the total solids of the sealer, of 5 cps. (centipoise) chlorinated rubber is included. The addition of the chlorinated rubber increases the apparent build of the sealer coat and tends to minimize the surface irregularities of wooden surfaces due to variations in the grain. It has also assisted in the "wetting" of the wet filler coat so that upon application of the sealer to the filler there is no tendency upon the part of the sealer to "crawl" and produce "islands" of sealer surrounded by uncoated filler.

The alkyd resin portion of the sealer coat is preferably made by alcoholysis of a major portion of the drying oil with glycerine in the presence of a litharge catalyst at 440 degrees F. When the glyceride mixture formed becomes compatible with phthalic anhydride the alcoholysis is sufficiently advanced to proceed with the cook. Meanwhile, the batch is kept under an inert gas blanket to protect the color. Phthalic anhydride within the critical proportion indicated is added and cooking continued, during which cooking time esterification and rearrangement is believed to occur. After about four and one-half hours processing at 450 degrees F., the remaining quantity of drying oil is added and the batch subjected to a 20 cubic foot per minute inert gas blow for about an hour at 450 degrees F., to a "cure" value of 20 to 30 seconds. The temperature is reduced to 425 degrees F., and at a 12 to 15 second "cure" the batch is dropped into a mixture of approximately one-third varnish makers' naphtha and two-thirds xylol. The base varnish contains 50% solids and has an acid value of from 7 to 9. A blend is then made by cold cutting the chlorinated rubber in toluene and blending with the base alkyd and appropriate driers.

Figure 1 is illustrative of the quantitative and qualitative limits of working range of the sealer composition, the limits being defined by points A, B, C and D which are representative of the formulation of the sealer coat. The volatile portion of the sealer will be varied in amount and kind according to the method of application, whether by brush or spray. While a blend of xylene and naphtha is the most suitable solvent for general purposes, some variations in solvent can be made as will be appreciated by those working in the art.

The solids portion of the compositions by weight represented at points A, B, C and D are:

A. 5% chlorinated rubber
   23.7% phthalic anhydride
   71.3% drying oil-polyhydric alcohol
B. 5% chlorinated rubber
   38% phthalic anhydride
   57% drying oil-polyhydric alcohol
C. 50% chlorinated rubber
   12½% phthalic anhydride
   37½% drying oil-polyhydric alcohol
D. 50% chlorinated rubber
   20% phthalic anhydride
   30% drying oil-polyhydric alcohol The formula represented by point A contains a maximum oil content over which a lacquer can be applied without lifting. Drying is also poor where the oil content is above this point. Point D represents a maximum chlorinated rubber content with the maximum phthalic anhydride content. An increase of chlorinated rubber above this point results in a product having poor working properties in that it will "cobweb" or "veil" from a spray gun, and after application will form a film of brittle character. Point B determines the maximum phthalic anhydride content of the film solids at minimum chlorinated rubber content and point C represents the composition of the sealer solids with maximum chlorinated rubber and drying oil contained therein.

Figure 2:
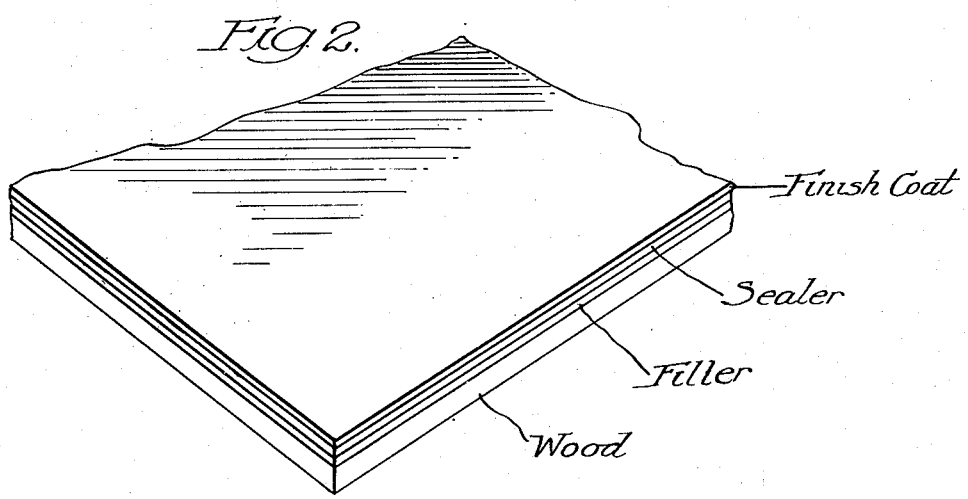

Figure 2 illustrates the finished article showing the relative arrangement of coatings.

The examples which follow further illustrate the manufacture and use of the compositions which have been found to produce superior wood finishes over those heretofore used in the art.

In the following examples all of the parts are by weight unless otherwise specified.

Example I

PREPARATION OF THE FILLER OIL 20 parts maleic anhydride
380 parts linseed fatty acids
380 parts linseed oil were weighed into a stainless steel kettle equipped with an agitator, inert gas delivery tube and thermometer. A blanket of inert gas was maintained over the mass which was heated to a temperature of 375 degrees F., in 45 minutes.

The temperature was held for one hour at 375 degrees F. during which time the maleic anhydride reacted with the unsaturated portion of the linseed acids and linseed oil.

1.7 parts litharge in
85.0 parts pentaerythritol was added, the temperature increased to 450 degrees F., and the batch held for a body at 75 degrees F. of H-I on the Gardner-Holdt scale. The yield was 100 gallons net of an oil having an acid value of 30.

Example II

PREPARATION OF THE FILLER 670 parts calcium sulfate hydrate
200 parts magnesium silicate
22 parts burnt Turkey umber
37 parts Turkey red lake
4 parts carbon black
6 parts aluminum distearate
185 parts "filler oil" (Ex. I)
160 parts aromatic naphtha
90 parts dried (10% lead, 2% magnesium, 2% cobalt) (percentages of metal)
4 parts methyl ethyl ketoxime (antiskin)

The blend of pigments and oil were thoroughly mixed in a dough mixer to a uniform consistency to give a mahogany filler.

For use over hard, dense grain woods an oil stain was made by inclusion of colored pigments, drying oils and thinners much the same as in the formula given under Example II with omission of the inert or color free pigments above.

Example III

PREPARATION OF BASE ALKYD VARNISH 1750 parts soya bean oil
905 parts glycerine
2½ parts litharge The first two of the above ingredients were weighed into a stainless steel Dowtherm jacket heated kettle equipped with agitator, pyrometer and inert gas blow ring and heated to 400 degrees F. in one and one-half hours. The litharge, pasted with a small quantity of the oil, was added and the temperature increased to 440 degrees F. in an additional half hour. At the end of two and one-half hours of total cooking time, the alcoholized oil was found to be compatible with phthalic anhydride which was indicative that a major portion of the drying oil triglyceride had been converted to the mono- and di-glyceride.

1610 parts phthalic anhydride were added at 440 degrees F. and the heating increased to bring the temperature to 450 degrees F. after four and one-half hours total cooking time. Meanwhile an inert gas blanket of carbon dioxide was maintained over the batch.

885 parts of China-wood oil were added and a 20 cubic foot per minute inert gas blow was started through the batch at 450 degrees F.

After a little more than five and one-half hours' total cook, a "cure" value of 25 seconds was obtained, the inert gas blow was increased to 30 cubic feet per minute and the temperature reduced to 425 degrees F. At a 12 to 15 second "cure" the total batch was dropped into 3535 parts xylol mixed with
1515 parts varnish makers' naphtha yielding a 50% solids varnish having an acid value of from 7 to 9.

This composition contains approximately 30% of phthalic anhydride based on the vehicle solids which is near the minimum amount. It has been found possible to decrease the phthalic anhydride to 25% which is a minimum amount that may be used with consistent anti-lifting properties. This vehicle is within the preferred composition range.

*Example IV*

PREPARATION OF BASE ALKYD VARNISH 2013 parts alkali refined linseed oil
1142 parts glycerine
2 parts litharge In equipment similar to that described in Example III the first two ingredients were heated to 400 degrees F. in one hour, the litharge pasted in a portion of the oil was added and the temperature increased to 440 degrees F. in twenty minutes. The temperature was held at 440 degrees F. for one hour, or until the alcoholized oil was compatible with phthalic anhydride.

Then 1965 parts of phthalic anhydride were added and the temperature was increased to 460 degrees F. with caution. During this part of the cook an inert gas blanket was maintained over the batch. The temperature was held at 460 degrees F. for two and one-half hours, then the batch was blown with ten cubic feet per minute of inert gas blow to a 35 second "cure." Following this reference point the blow was increased to twenty cubic feet per minute, the temperature allowed to fall to 430 degrees F. and held for a 20 second cure and an acid value of 4 to 7.

The batch was then dropped into 4825 parts xylene to yield an oil modified alkyd resin having a non-volatile content of 49% by weight and a Gardner viscosity of W-Y.

The phthalic anhydride in the non-volatile portion of this varnish vehicle was about 38.5%. It has been found that the percentage of phthalic anhydride can be increased slightly above this figure and still function to produce the desired result. However, in the preferred formulas, the phthalic anhydride content is somewhat lower.

*Example V*

SEALER COAT COMPOSITION 54 parts 5 centipoise [1] chlorinated rubber
480 parts toluene
8 parts propylene oxide
215 parts base alkyd varnish of Examples III or IV
10 parts manganese naphthenate drier
1 part methyl ethyl ketoxime

[1] Hercules chlorinated rubber containing from 65 to 70% chlorine. The yield was 100 gallons and the weight per gallon 7.62 pounds.

The chlorinated rubber was dissolved in the toluene and the other ingredients blended into the chlorinated rubber solution to complete the base sealer cost. Lead and cobalt driers were omitted because of the apparent reactivity with the chlorine of the chlorinated rubber.

*Example VI*

PREPARATION OF A LACQUER TOP COAT 100 parts ½ second nitrocellulose (65% R. S. nitrocellulose—35% ethyl alcohol)
39 parts rosin ester (Cellolyn 102) (a Hercules Powder Co. product)
39 parts blown soya bean oil
9 parts tricresyl phosphate
16 parts butyl stearate
65 parts ethyl acetate
230 parts butyl acetate
175 parts xylene
75 parts toluene The above ingredients are mixed together in a covered tank equipped with an agitator to form a finish lacquer type top coat. This composition is within the skill of lacquer formulators and is merely meant to be illustrative of a lacquer type finish coat and of the solvents which cause lifting of the usual varnish sealer coat.

*Example VII*

FINISHING PROCESS FOR WOODEN FURNITURE

A piano bench top having been sanded and stained with a mahogany spirit stain was spray coated with the filler of Example II, which had been reduced to spraying consistency with equal parts of varnish makers' naphtha. After several minutes air drying at 77 degrees F., the excess filler was wiped off by rubbing the surface across the grain with a cotton cloth waste. Shortly thereafter, the sealer composition of Example V was sprayed over the wet filler full body (without thinning) and the bench top air dried for four hours at 125 degrees F. (or force dried for one and one-half hours).

Following the co-drying of the filler and the sealer, the sealer coat was smoothed lightly with sandpaper to remove any occluded particles and a top or finish coat of the lacquer of Example VI was sprayed over the sealer immediately thereafter. After an hour's air drying at 77 degrees F., the finish of the bench top was in a condition to be assembled. The total time of the finishing operation was under six hours and a rich, tough coating was produced which, upon attempt to scratch with a coin as previously described, showed no separation between subsequent coatings and upon duplicating the test with greater pressure on the coin the wood was distorted beneath the film without breaking the bond between the successive coatings.

Normally, such a test will produce an opaque white streak across the surface. The film was resistant to alcohol and upon being submerged in water for 24 hours no separation between the wood and the finish was observed.

In Example VII, the lacquer top coat can be supplanted with a varnish type top coat and an equivalent quality of finish is obtained with the sacrifice of the additional time necessary for the varnish top coat to dry, which is usually from one and one-half to twelve hours depending upon the character of the varnish finish coat and upon whether forced or air drying is used.

When lacquer top coats are used over the described filler-sealer combination, there is no lifting or failure of bond between the sealer and the top coat, and no precipitation of nitrocellulose in the top coat has been observed.

In the system proposed there is apparently an unusual adhesion developed between the subsequent coats so that there is unusually good clarity of the film without objectionable color development due to incompatibility. Because of the high degree of compatability between the subsequent coats, there is developed a depth and fullness heretofore obtained only by repeated coating operations coupled with expensive and time consuming sanding operations.

The "cure" mentioned, refers to the time required in seconds for a drop of the sealer solids to gel when spread in a thin film with a pointed metal tool upon a polished metal hot plate maintained at 392 degrees F.

The filler oil can be classified as a maleic treated drying oil-pentaerythritol ester, and the percentage of maleic used should exceed 1% but should not exceed 5% by weight of the total filler oil. Larger amounts of maleic anhydride interfere with the wiping characteristic of the wood filler during application. The acid value is critical and should be between 15 and 40 and preferably between 28 and 38 to obtain optimum results.

In the coatings described, a drying oil forms a part of the composition. The term "drying oil" is meant to be applicable to any vegetable, animal or marine oil having an iodine value in excess of 120 (Wijs) capable of polymerization. While linseed, soya bean and China-wood oil have been used in the examples, other oils of the defined class are within the scope of the disclosure.

It is also to be observed that while glycerine is the usual polyhydric alcohol employed in addition to the alcohol forming an integral part of a drying oil, other polyhydric alcohols can be substituted wholly or in part for the glycerine on a hydroxyl equivalent basis. Examples of such alcohols are pentaerythritol, sorbitol, mannitol, glycols, di-pentaerythritol and poly-pentaerythritols.

The percentage of chlorinated rubber in the sealer coat of Example V may be varied between 5% to 50% of the sealer coat solids, it being preferred, however, to maintain the rubber at from 25% to 35% of the solids in the sealer coat in order to assure good wetting of the wet filler coat and adequate build in the sealer.

It is to be understood that while chlorinated rubber of higher viscosity types may be used, e. g., 10 cps. to 20 cps. types, we prefer the lower viscosity material in order to keep a relatively high solids content without unduly increasing the viscosity of the composition. The chlorine content is preferably 60 to 70% by weight but may vary.

While the phthalic anhydride content of the sealer is known to be important in respect to lifting of the sealer by the subsequent lacquer applications, it is also believed that the adhesion between the filler and the sealer is of such nature that separation of these coatings has been made more difficult because of the unusual bond obtained through the methods and materials described.

The application of the sealer to the filler coat while the filler is wet results in a time saving which is very important and makes the practice of drying the filler before application of the sealer economically unsound and obsolete. The sealer coat herein provided permits the treatment of the wet filler coat without defects due to poor wetting action and such treatment augments and strengthens the bond between the various layers.

As was previously indicated, drying rooms are generally the bottleneck in the finishing operation, the less drying time needed per unit finished, the less does this handicap interfere with an increase in production requirements.

The products herein, when used in combination as described, produce a quality of finish and a finished product superior to that achieved with prior compositions and prior practice and with economies of particular interest to the furniture industry operating under heavy demand on its production facilities.

The invention is hereby claimed as follows:

1. An article of furniture which comprises a wooden base, a primary coating composition thereon containing a polar oil resulting from the esterification and interesterification with excess pentaerythritol of the addition product of a drying oil and 1% to 5% by weight of maleic anhydride and characterized by freedom from polycarboxylic acid constituents other than those derived from maleic anhydride and by an acid value of from 15 to 40, and a secondary sealing coating superimposed on the primary coating comprising 5% to 50% by weight of total solids of chlorinated rubber and an oil modified alkyd resin of which 25% to 40% by weight is represented by phthalic anhydride.

2. An article of furniture which comprises a wooden base, a primary coating composition thereon whose vehicle portion is a polar drying oil containing from 1% to 5% by weight of maleic anhydride and characterized by freedom from polycarboxylic acid constituents other than those derived from maleic anhydride and by an acid value of from 15 to 40 after having been further partially reacted with an excess of the theoretical quantity of pentaerythritol, and a secondary sealing coating superimposed on the primary coating comprising 5% to 50% by weight of the total solids of chlorinated rubber and an oil modified alkyd resin of which 28% to 35% by weight is represented by phthalic anhydride.

3. An article of furniture which comprises a wooden base, a primary coating composition thereon containing a polar oil resulting from the reaction of a drying oil and 1% to 5% by weight of maleic anhydride and characterized by freedom from polycarboxylic acid constituents other than those derived from maleic anhydride and by an acid value of from 15 to 40 after having been further partially reacted with an excess of the theoretical quantity of pentaerythritol, a secondary sealing coating superimposed on the primary coating comprising 5% to 50% by weight of total solids of chlorinated rubber and an oil modified alkyd resin of which 25% to 40% by weight is represented by phthalic anhydride, and a finish coating from the group consisting of varnishes and lacquers over said secondary sealing coating.

4. An article of furniture which comprises a wooden base, a primary coating composition thereon containing a polar oil resulting from the reaction of a drying oil and 1% to 5% by weight of maleic anhydride and characterized by freedom from polycarboxylic acid constituents other than those derived from maleic anhydride and by an acid value of from 15 to 40 after having been further partially reacted with an excess of the theoretical quantity of pentaerythritol, a secondary sealing coating superimposed on the primary coating comprising 5% to 50% by weight of total solids of chlorinated rubber and an oil modified alkyd resin of which 25% to 40% by weight is represented by phthalic anhydride, and a finish nitrocellulose lacquer coating over said secondary sealing coating.

5. An article of furniture which comprises a wooden base, a primary coating composition thereon consisting essentially of a filler material and a polar drying oil, said oil being the product of addition of a drying oil and from 1% to 5% by weight of maleic anhydride on the basis of the drying oil characterized by freedom from polycarboxylic acid constituents other than those derived from maleic anhydride and by an acid value of from 15 to 40 and the further reaction thereof with pentaerythritol wherein the molal ratio of acidic groups in the maleic-oil to alcohol groups in the pentaerythritol is not in excess of 1.5:2.5, a secondary sealing coating superimposed on the primary coating consisting essentially of 5% to 50% by weight of the total solids of a chlorinated rubber containing 60% to 70% chlorine, a glycerine-phthalic anhydride-drying oil modified resin of which 28% to 35% by weight is represented by phthalic anhydride, and a metal naphthenate drier and a top finish coating over said secondary sealing coating consisting essentially of a nitrocellulose lacquer.

6. A process for finishing wooden articles which comprises applying thereto a filler containing a polar maleic treated drying oil-pentaerythritol ester vehicle having an acid value between 15 and 40 and being free from polycarboxylic acid constituents other than those derived from maleic anhydride, removing the excess, and immediately thereafter before substantial oxidation occurs, applying over the said wet filler an oil modified alkyd varnish-chlorinated rubber containing sealed coat and co-drying the said filler and the said sealer to produce a filler hardened essentially by polymerization out of contact with the air, said combination producing a base finish characterized by its recoatability with nitrocellulose lacquers in solution in lacquer solvents without lifting or separation between the co-dried coatings and the strong adhesion between the successive coatings.

7. The process for finishing wooden articles which comprises applying thereto a filler composition whose vehicle portion is a polar maleic treated drying oil-pentaerythritol ester containing from 1% to 5% by weight of maleic anhydride and characterized by freedom from polycarboxylic acid constituents other than those derived from maleic anhydride and by an acid value of from 15 to 40, removing the excess, and immediately thereafter before substantial oxidation occurs, applying over the said wet filler coating a secondary sealing coating comprising 5% to 50% by weight of total solids of chlorinated rubber, the remainder of the solids in said composition being essentially a drying oil modified alkyd resin and a drier, said oil modified alkyd resin containing 25% to 40% by weight of phthalic anhydride, and co-drying said coatings.

8. The process for finishing wooden articles which comprises applying thereto a filler composition whose vehicle portion is a polar maleic treated drying oil-pentaerythritol ester containing from 1% to 5% by weight of maleic anhydride and characterized by freedom from polycarboxylic acid constituents other than those derived from maleic anhydride and by an acid value of from 15 to 40, removing the excess, and immediately thereafter before substantial oxidation occurs, applying over the said wet filler coating a secondary sealing coating comprising 5% to 50% by weight of total solids of chlorinated rubber, the remainder of the solids in said composition being essentially a drying oil modified glycerine phthalic anhydride resin and a drier, said oil modified alkyd resin containing 25% to 40% by weight of phthalic anhydride, and co-drying said coatings.

9. The process for finishing wooden articles which comprises applying thereto a filler composition whose vehicle portion is a polar maleic treated drying oil-pentaerythritol ester containing from 1% to 5% by weight of maleic anhydride and characterized by freedom from polycarboxylic acid constituents other than those derived from maleic anhydride and by an acid value of from 15 to 40, removing the excess, and immediately thereafter before substantial oxidation occurs, applying over the said wet filler coating a secondary sealing coating comprising 5% to 50% by weight of total solids of chlorinated rubber, the remainder of the solids in said composition being essentially a drying oil modified glycerine phthalic anhydride resin and a drier, said oil modified alkyd resin containing 25% to 40% by weight of phthalic anhydride, co-drying said coatings, and applying a nitrocellulose lacquer top finish to said secondary sealing coating.

10. The process for finishing wooden articles which comprises applying thereto a filler composition whose vehicle portion is a polar maleic treated drying oil-pentaerythritol ester containing from 1% to 5% by weight of maleic anhydride and characterized by freedom from polycarboxylic acid constituents other than those derived from maleic anhydride and by an acid value of from 15 to 40, removing the excess, and immediately thereafter before substantial oxidation occurs, applying over the said wet filler coating a secondary sealing coating comprising 5% to 50% by weight of total solids of chlorinated rubber, the remainder of the solids in said composition being essentially a drying oil modified glycerine phthalic anhydride resin and a drier, said oil modified alkyd resin containing from 28% to 35% by weight of phthalic anhydride, co-drying said coatings, and applying a nitrocellulose lacquer top finish to said sealing coating.

11. A process for finishing wooden articles which comprises applying thereto a filler containing a polar maleic treated drying oil-pentaerythritol ester type vehicle having a maleic anhydride content greater than 1% and less than 5% which possesses an acid value between 28 and 35 and being free from polycarboxylic acid constituents other than those derived from maleic anhydride, removing the excess filler, and immediately thereafter, before substantial oxidation occurs, applying over the said wet filler an oil modified alkyd varnish-chlorinated natural rubber containing sealer coat, the nonvolatile of the oil modified alkyd varnish portion characterized by a phthalic anhydride content of between 25% to 35% and the solids of said sealer coat containing from 5% to 50% of said rubber, and co-drying the said filler and said sealer to produce a filler hardened essentially by polymerizing out of contact with the air, said combination producing a finishing system characterized by its recoatability with film-forming solutions selected from the group consisting of nitrocellulose lacquers, ethyl cellulose lacquers and oleo-resinous varnishes without lifting or separation between any interface thereby created, and said interfaces characterized by their cohesive strength as demonstrated by their high resistance to shearing stresses.

References Cited in the file of this patent
UNITED STATES PATENTS

| | | |
|---|---|---|
| 1,912,369 | Jacobson et al. | June 6, 1933 |
| 1,912,370 | Jacobson et al. | June 6, 1933 |
| 1,912,371 | Jacobson et al. | June 6, 1933 |
| 2,011,941 | Phillips | Aug. 13, 1935 |
| 2,145,639 | Zander | Jan. 31, 1939 |
| 2,188,884 | Clocker | Jan. 30, 1940 |
| 2,338,461 | Schultze | Jan. 4, 1944 |
| 2,374,381 | Root | Apur. 24, 1945 |
| 2,389,708 | Zolad | Nov. 27, 1945 |